(12) United States Patent
Schlienger

(10) Patent No.: US 6,360,670 B1
(45) Date of Patent: Mar. 26, 2002

(54) MAGNETICALLY COUPLED TRANSPORTATION MODULE

(75) Inventor: Max P. Schlienger, Ukiah, CA (US)

(73) Assignee: Flight Rail Corporation, Ukiah, CA (US)

( * ) Notice: Subject to any disclaimer, the term of this patent is extended or adjusted under 35 U.S.C. 154(b) by 0 days.

(21) Appl. No.: 09/534,810

(22) Filed: Mar. 24, 2000

Related U.S. Application Data (63) Continuation-in-part of application No. 09/411,626, filed on Oct. 1, 1999, now Pat. No. 6,279,485, which is a continuation-in-part of application No. 09/411,790, filed on Oct. 1, 1999, now abandoned.

(51) Int. Cl.⁷ .............................................. B61B 13/00
(52) U.S. Cl. ........................ 104/156; 104/139; 104/283
(58) Field of Search ......................... 104/138.1, 138.2, 104/139, 155, 156, 157, 165, 283

(56) References Cited

U.S. PATENT DOCUMENTS 5,388,526 A * 2/1995 Imai ........................ 104/138.1
5,537,929 A * 7/1996 Miura et al. ................. 104/156
5,564,339 A * 10/1996 Miura et al. ............. 104/138.1
5,826,701 A * 10/1998 Miura ..................... 104/138.1

* cited by examiner

Primary Examiner—Mark T. Le
(74) Attorney, Agent, or Firm—Townsend and Townsend and Crew LLP (57) ABSTRACT

A transportation system for moving a transportation module comprises a thrust tube and a pod assembly disposed inside the thrust tube to be thrusted along the thrust tube. An inner magnetic coupler is disposed inside the thrust tube and connected with the pod assembly to be moved by the pod assembly. An outer magnetic coupler is disposed outside the thrust tube and configured to connect with a transportation module. The outer magnetic coupler is spaced from the inner magnetic coupler by the thrust tube and is magnetically coupled with the inner magnetic coupler to be moved by the inner magnetic coupler. An inner spacing member is disposed inside the thrust tube and spaces the inner magnetic coupler from the inner surface of the thrust tube by a preset distance. An outer spacing member is disposed outside the thrust tube and spaces the outer magnetic coupler from the outer surface of the thrust tube by a preset distance.

21 Claims, 6 Drawing Sheets

MAGNETICALLY COUPLED TRANSPORTATION MODULE

CROSS-REFERENCES TO RELATED APPLICATIONS

This application is a continuation-in-part of and claims priority from U.S. patent application, Ser No. 09/411,626, entitled "Pod Assembly for Light Rail Transportation", filed Oct. 1, 1999, now U.S. Pat. No. 6,279,485 and U.S. patent application, Ser. No. 09/411,790, entitled "Guideway System for Light Rail Transportation", filed Oct. 1, 1999, now abandoned. This application is related to concurrently filed and commonly assigned U.S. patent application Ser. No. 09/535,229, now U.S. Pat. No. 6,267,058, entitled "Coupling Mechanism for Magnetically Coupled Transportation Module". These applications are incorporated herein by reference.

BACKGROUND OF THE INVENTION

This invention relates to a transportation system and, more particularly, to a guideway system for light rail transportation.

Rapid mass ground transportation systems offer many benefits over non-mass transportation means such as the use of automobiles, particularly in metropolitan areas experiencing severe traffic congestion and pollution problems. Mass ground transportation may also be a desirable alternative for short-range as well as long-range air travel. Although there has been a general recognition of the need for a reliable, safe rapid transportation system, utilization of rapid transit systems has been hindered by the high cost of construction and operation as well as technical difficulties in developing an efficient and versatile light rail system.

Conventional approaches have not produced a light rail transportation system that is sufficiently versatile, efficient, and cost-effective to be a feasible substitute for non-mass transportation and air travel alternatives. For instance, some so-called light rail systems have rather heavy transportation modules due to the use of heavy undercarriage or a heavy power system, high traction requirements, high onboard fuel requirements, or the like. Systems that rely on traction drives tend to have difficulty with steep grades. Moreover, external elements such as severe weather conditions and contaminations can pose substantial difficulty in the operation and maintenance of light rail systems. Additionally, traction drive mechanisms employing wheels tend to produce a lot of noise as well as wear.

SUMMARY OF THE INVENTION

The present invention overcomes the difficulties and disadvantages of the prior art by providing simple solutions to specific problems associated with developing an efficient and cost-effective light rail transportation system. The invention provides a guideway system that does not depend on traction for movement. In a specific embodiment, the pod assembly is placed inside a guide tube, the exterior of which preferably supports and guides the vehicle as it moves along the tube. Motion is generated by providing a pressure differential inside the tube between the upstream region and the downstream region of the pod assembly. The pressure differential is preferably generated by a stationary power system that produces a vacuum on the downstream region or pressurizes the upstream region or both. The speed of the pod assembly is controlled by modulating the amount of gas flow through the pod, that is, from the upstream side to the downstream side of the pod. The speed of the pod assembly is increased by reducing the amount of gas flow through the pod assembly to thereby increase the thrust on it, and is decreased by permitting a larger amount of gas to flow past the pod assembly to decrease the thrust.

Because the thrust required to move the pod assembly is generated by stationary power systems, the vehicle does not require heavy on-board engines or drive trains. The pod assembly and guide tube are relatively light in weight and are well-suited for use in a light rail system. The guide tube can be elevated because of the light overall weight of the system, reducing right-of-way costs. When elevated, grading costs and requirements are significantly reduced.

A magnetic coupling apparatus is used to couple the pod assembly inside the guide tube with the transportation module outside the guide tube. The use of a magnetic coupling apparatus eliminates the need to mechanically connect the pod assembly and the transportation module with a strut extending through a longitudinal opening in the wall of the guide tube. This allows the interior of the guide tube to be a closed system and avoids the need for a seal assembly for maintaining a desired pressure differential in the guide tube as the strut knives through the longitudinal opening of the guide tube, thereby improving mechanical integrity and pressure integrity of the system. Moreover, the use of the magnetic coupling apparatus instead of a mechanical coupling device makes it easier to clean the exterior of the guide tube and coupling apparatus or clear those areas of debris such as the removal of ice and snow. Magnetic coupling also allows disengagement of the pod assembly and transportation module without any mechanical linkage or disengagement. Because the transportation module is supported by he exterior surface of the guide tube, the weight of the transportation module is not carried by the pod assembly.

In accordance with an aspect of the present invention, a transportation system for moving a transportation module comprises a thrust tube and a pod assembly disposed inside the thrust tube to be thrusted along the thrust tube. An inner magnetic coupler is disposed inside the thrust tube and connected with the pod assembly to be moved by the pod assembly. An outer magnetic coupler is disposed outside the thrust tube and configured to connect with a transportation module. The outer magnetic coupler is spaced from the inner magnetic coupler by the thrust tube and is magnetically coupled with the inner magnetic coupler to be moved by the inner magnetic coupler.

In some embodiments, an inner linkage is connected between the inner magnetic coupler and the pod assembly to prevent magnetic loading on the pod assembly by the inner magnetic coupler. An outer linkage is connected between the outer magnetic coupler and the transportation module to prevent magnetic loading on the transportation module by the outer magnetic coupler. At least the portion of the thrust tube between the inner magnetic coupler and the outer magnetic coupler is made of a non-metallic material.

In accordance with another aspect of the invention, a transportation system for moving a transportation module comprises a thrust tube and an inner drive member disposed inside the thrust tube to be thrusted along the thrust tube. An inner magnetic coupler is disposed inside the thrust tube and connected with the inner drive member to be moved by the inner drive member. An inner spacing member is disposed inside the thrust tube and spaces the inner magnetic coupler from the inner surface of the thrust tube by a preset distance. An outer magnetic coupler is disposed outside the thrust tube and is configured to connect with a transportation module. The outer magnetic coupler is magnetically coupled with the inner magnetic coupler to be moved by the inner magnetic coupler.

In specific embodiments, the inner support member spaces the inner magnetic coupler from the inner surface of the thrust tube by about 0.03 to about 0.5 inch. The inner support member comprises a plurality of rollers coupled between the inner magnetic coupler and the inner surface of the thrust tube.

In accordance with another aspect of the invention, a transportation system for moving a transportation module comprises a thrust tube and an inner drive member disposed inside the thrust tube to be thrusted along the thrust tube. An inner magnetic coupler is disposed inside the thrust tube and connected with the inner drive member to be moved by the inner drive member. An outer magnetic coupler is disposed outside the thrust tube and is configured to connect with a transportation module. The outer magnetic coupler is magnetically coupled with the inner magnetic coupler to be moved by the inner magnetic coupler. An outer spacing member is disposed outside the thrust tube and spaces the outer magnetic coupler from the outer surface of the thrust tube by a preset distance.

In specific embodiments, the outer support member spaces the outer magnetic coupler from the outer surface of the thrust tube by about 0.03 to about 0.5 inch. The outer spacing member comprises a plurality of rollers coupled between the outer magnetic coupler and the outer surface of the thrust tube.

DESCRIPTION OF THE SPECIFIC EMBODIMENTS

Figure 1:
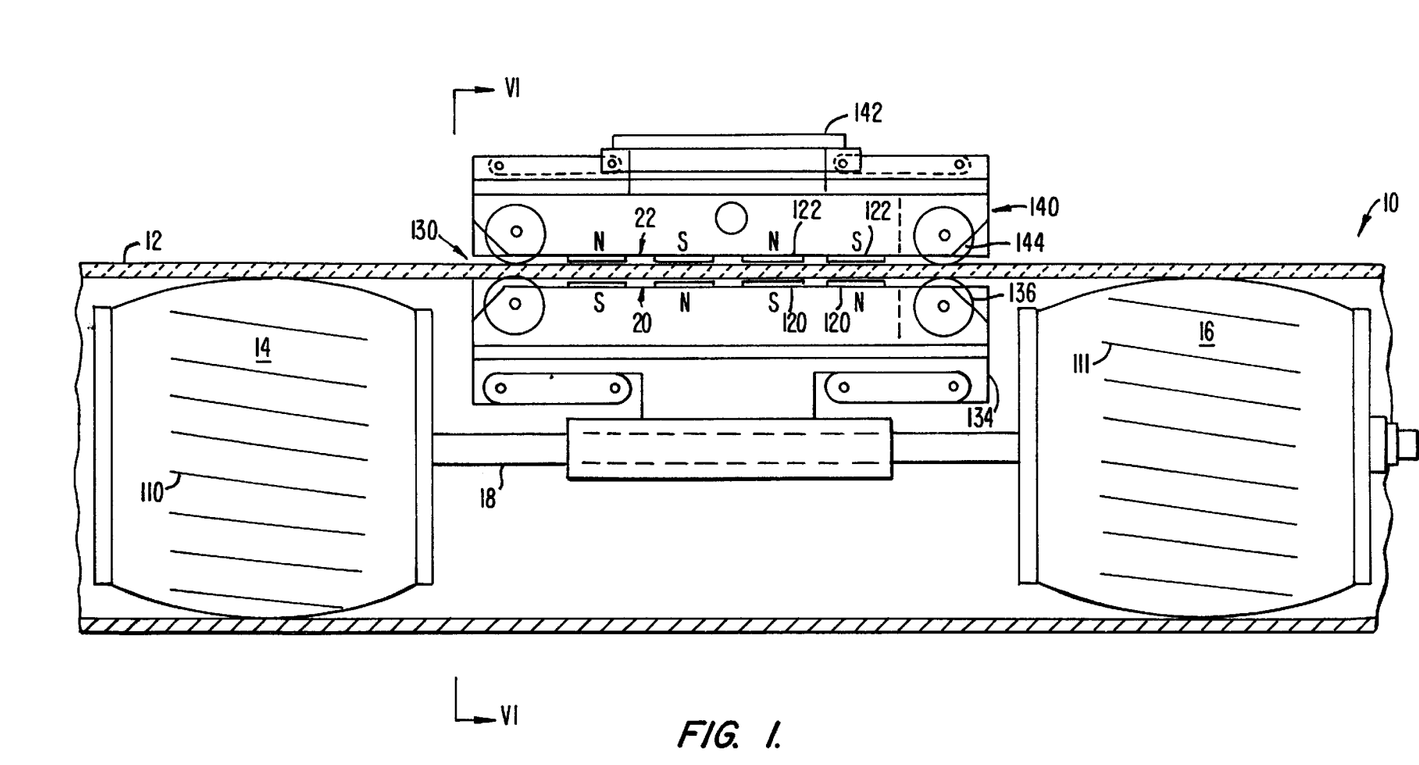
FIG. 1 is a partial cross-sectional front view of a pod assembly disposed in a guide tube for supporting a transportation module in accordance with an embodiment of the present invention.
Figure 2:
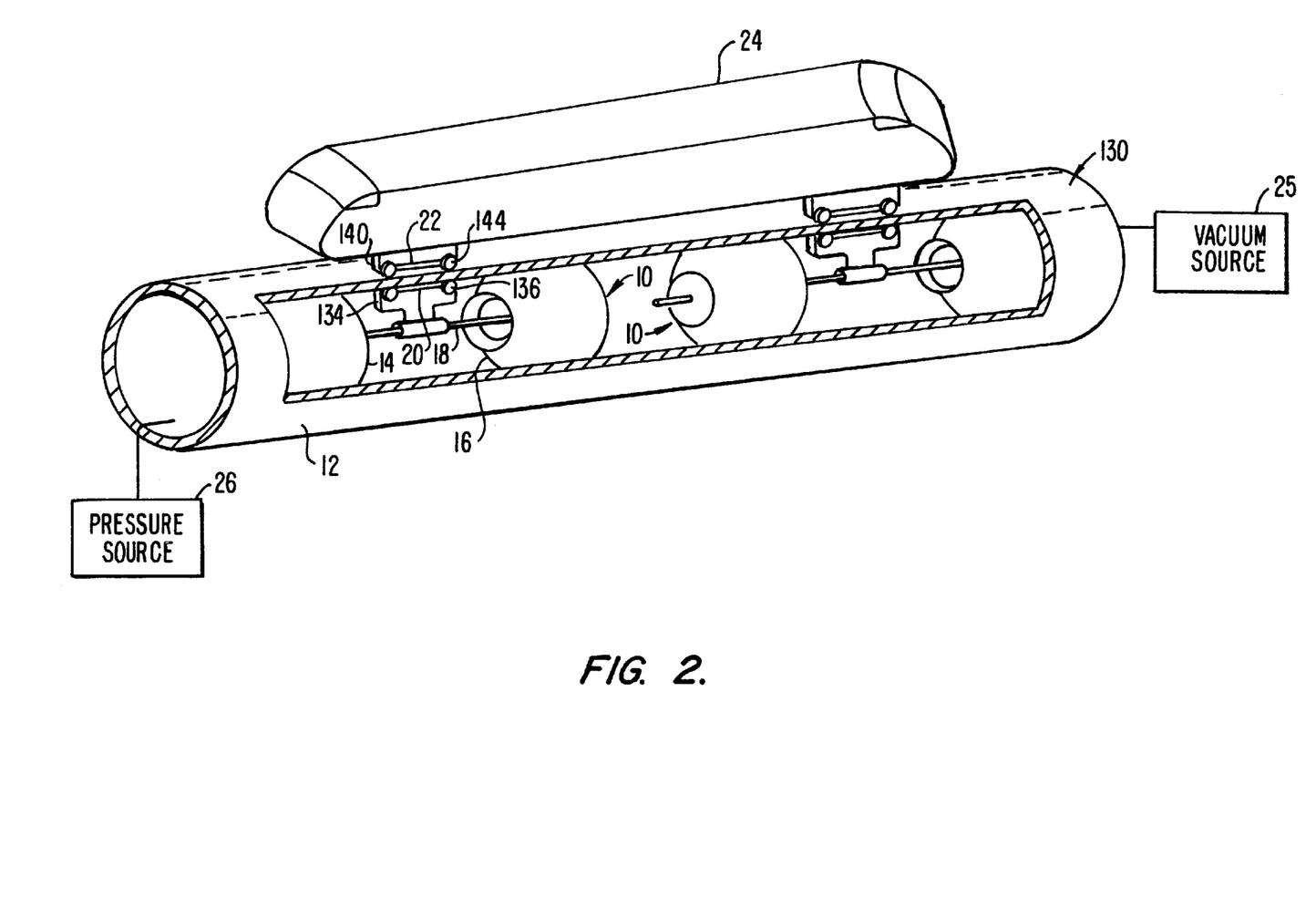
FIG. 2 is a perspective view with a cut-away portion of a guideway system illustrating the pod assembly of FIG. 1 disposed in the guide tube and a transportation module disposed outside the guide tube.

FIGS. 1 and 2 show a pod assembly or otter assembly 10 disposed in a guide tube or thrust tube 12, which in this embodiment is a generally circular tube. The pod assembly 10 includes a thrust pod 14 and a passive pod 16 coupled together by a hollow shaft or axle 18. The guide tube 12 guides the pods 14, 16 for traveling therein. The guide tube 12 is sealed at the ends. An inner magnetic coupler 20 is connected with the axle 18. An outer magnetic coupler 22 is disposed outside the guide tube 12, and is magnetically coupled with the inner magnetic coupler 20. A transportation module or cargo unit 24 is connected with the outer magnetic coupler 22. When the pod assembly 10 travels inside the guide tube 12, its movement is transferred via the magnetic couplers 20, 22 to thrust the transportation module 24 along the exterior surface of the guide tube 12.

FIG. 2 shows a vacuum source 25 coupled with the downstream side of the pod assembly 10 and a pressure source 26 coupled with the upstream side of the pod assembly 10. Either or both of the vacuum source 25 and the pressure source 26 can produce pressure differential between the upstream region and the downstream region of the pod assembly 10 to drive the pod assembly along the length of the guide tube 12. The guide tube 12 is closed to form a closed system inside. The closed tube 12 provides improved mechanical integrity and pressure integrity.

Pod Assembly

Figure 3:
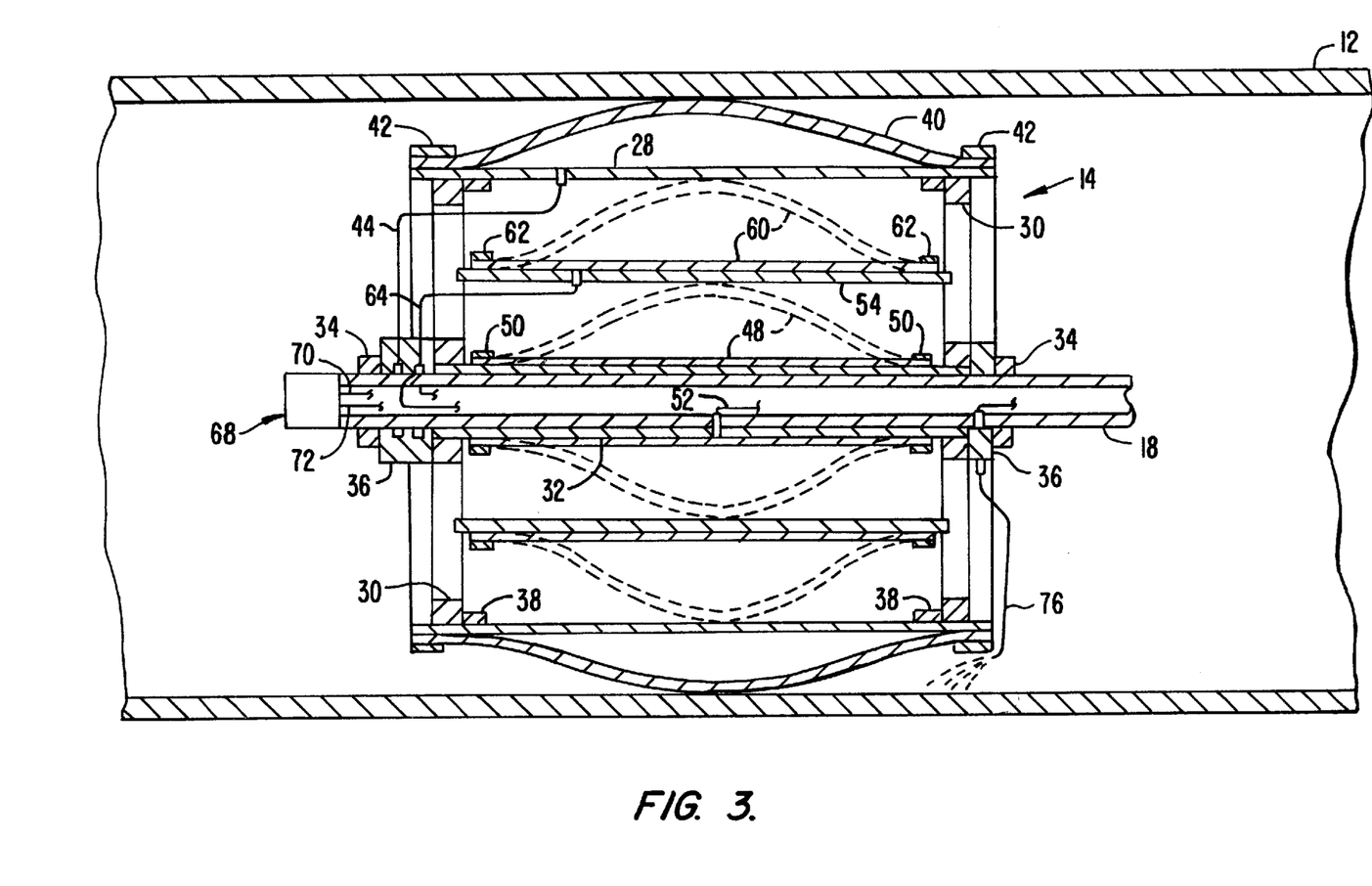
FIG. 3 is a partial cross-sectional front view of a thrust pod in the pod assembly of FIG. 1.
Figure 4:
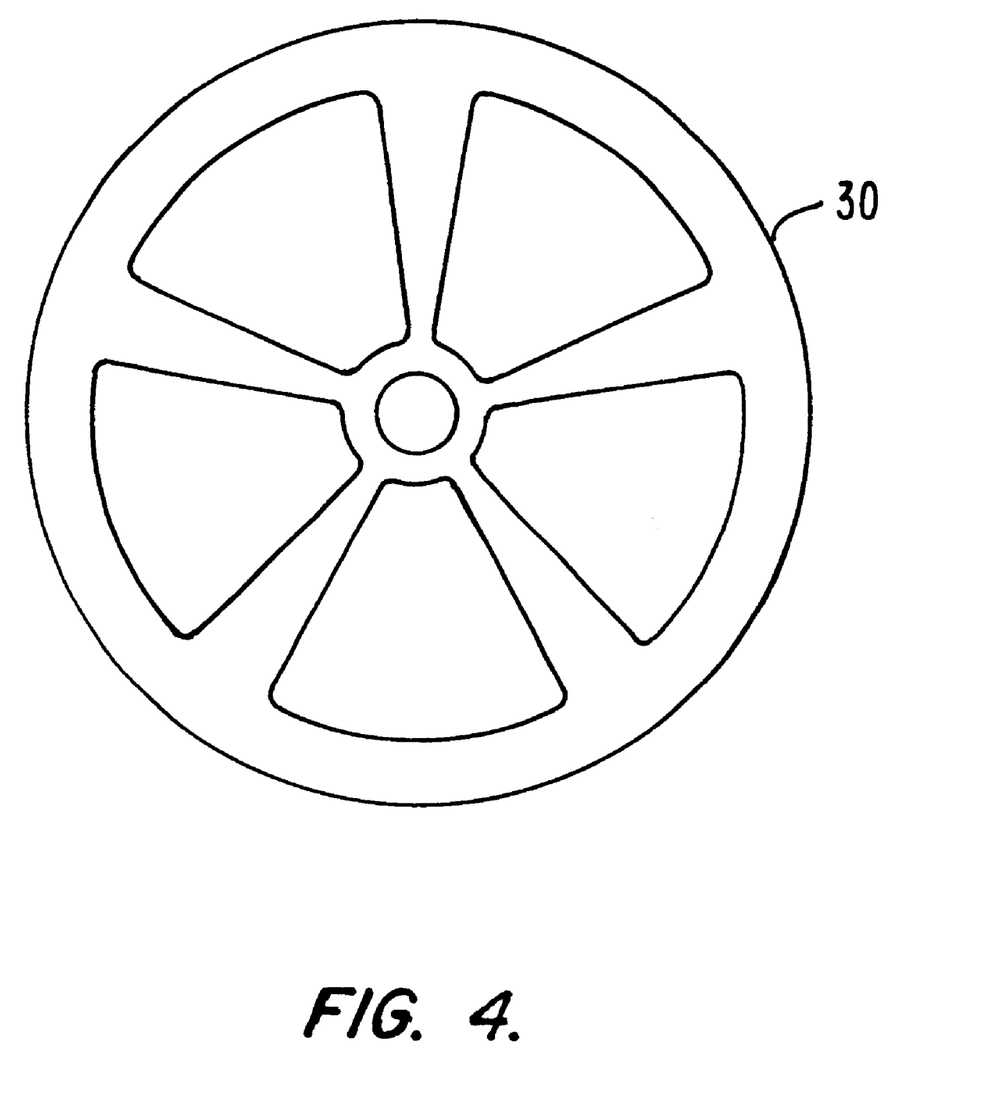
FIG. 4 is an elevational view of a hub in the thrust pod of FIG. 3.

The detailed structure of the thrust pod 14 is shown in FIG. 3. The thrust pod 14 includes a generally cylindrical wall 28 having a front end and a rear end. In this embodiment, the cylindrical wall 28 is generally circular and has a smaller diameter than the interior of the guide tube 12. The axle 18 extends along the axis of the cylindrical wall 28, and is connected with the cylindrical wall 28 by a pair of hubs 30 at the front end and rear end, respectively, of the wall 28. As best seen in FIG. 4, the hubs 30 include openings that allow gas to flow between the front end and the rear end of the cylindrical wall 28. A thrust tubular member 32 is desirably disposed between the axle 18 and the hubs 30. The thrust tubular member 32 surrounds the axle 18 and is located on the axle 18 by a pair of clamps 34, which also serve as thrust bearings. A pair of rotating seal and bearing assemblies 36 connect the two hubs 30, respectively, with the thrust tubular member 32, so that the hubs 30 together with cylindrical wall 28 and tubular member 32 are rotatable relative to the axle 18 while maintaining a sealed connection therebetween. The axle 18 is generally a nonrotating member. A pair of rings 38 attached to the cylindrical wall 28 are used to locate the hubs 30 relative to the cylindrical wall 28. The hubs 30 may be attached to the rings 38 using bolts or the like.

A pod tire 40 is secured to the exterior of the cylindrical wall 28 by a pair of tire clamps 42 disposed at the two ends of the wall 28. The tire clamps 42 seal the connection, thereby forming an airtight cavity or enclosure between the pod tire 40 and the cylindrical wall 28. The enclosure is expandable with pressurized air or gas supplied through a gas line 44 connected through the thrust tubular member 32 and the hollow axle 18 to a gas source. The gas line 44 is coupled to the hollow axle 18 through the rotary seal and bearings assembly 36 to ensure proper gas connection and control even when the cylindrical wall 28 and hubs 30 rotate relative to the axle 18. FIG. 3 shows the pod tire 40 in an inflated state in contact with the guide tube 12, desirably in an approximately tangential manner. The pod tire 40 preferably has a smooth surface for making contact with the guide tube 12. The pressure in the enclosure can be adjusted remotely by controlling the gas flow through the gas line 44, for instance, from the transportation module 24.

A membrane or bladder 48 is coupled to the exterior of the thrust tubular member 32 by a pair of bladder clamps 50 disposed near the two hubs 30, respectively. The bladder clamps 50 seal the connection to provide an airtight cavity or enclosure between the bladder 48 and the thrust tubular member 32. The enclosure is expandable by air or gas supplied via a gas line 52 extending through the thrust tubular member 32 connecting in a rotatable manner with the hollow axle 18 to a gas source which is typically controlled remotely from the transportation module 24. In FIG. 3, the deflated position of the bladder 48 is shown in solid lines, while the inflated position is depicted in broken lines. In the inflated position, the bladder 48 is in contact with an inner tubular housing 54 to block gas flow through the portion of the thrust pod 14 between the thrust tubular member 32 and the inner tubular housing 54. The inner tubular housing 54 is coupled with and supported by the hubs 30. In the embodiment shown, the inner tubular housing 54 is received into grooves or slots in the hubs 30.

Another bladder 60 is coupled to the exterior of the inner tubular housing 54 by a pair of bladder clamps 62 disposed near the hubs 30, respectively. The bladder clamps 62 seal the connection to provide an airtight cavity or enclosure between the outer bladder 60 and the inner tubular housing 54. The enclosure is expandable by air or gas supplied through a gas line 64 connected through the rotary seal 36 and the hollow axle 18 to a gas source. The pressure in the enclosure is typically adjusted remotely by controlling the gas flow through the gas line 64 from the transportation module 24. The gas line 64 is coupled to the thrust tubular member 32 and hollow axle 18 through the rotary seal and bearings assembly 36 to ensure proper gas connection and control even when the cylindrical wall 28 and hubs 30 rotate relative to the axle 18. In FIG. 3, the deflated position of the outer bladder 60 is shown in solid lines, while the inflated position is depicted in broken lines. In the inflated position, the outer bladder 60 comes into contact with the cylindrical wall 28 to block gas flow through the portion of the thrust pod 14 between the inner tubular housing 54 and the cylindrical wall 28.

A head assembly 68 is desirably mounted to the front of the thrust pod assembly 14 to provide lights, camera, and the like. In the embodiment shown in FIG. 3, the head assembly 68 is attached to the front end of the nonrotating axle 18 and seals the front end. A video cable 70 is coupled between the camera in the head assembly 68 and a video receiver in the transportation module 24 for monitoring conditions in the guide tube 12. A power cable 72 provides power to the head assembly 68.

The thrust pod assembly 14 desirably includes a water line 76 supplying water for spraying onto the exterior of the pod tire 40, as illustrated in FIG. 3. The water line 76 extends through the rotary seal 36 and axle 18 to a water source. The water line 76 is coupled to the water source through the rotary seal and bearings assembly 36 to ensure proper gas and water connection and control even when the cylindrical wall 28 and hubs 30 rotate relative to the axle 18. The water source is typically carried on board the pod assembly 10. The water spray provides a lubricant layer between the pod tire 40 and the guide tube 12 that can lead to a hydroplaning effect between the pod tire 40 and guide tube 12 which can significantly reduce friction. It is noted that other fluids may be used instead of water The pod tire 40 is made of a low friction material such as Teflon, and is inflated to provide a very small circumferential clearance between the pod tire 40 and the guide tube 12 to minimize air leakage past it while minimizing friction between it and the guide tube wall.

Figure 5:
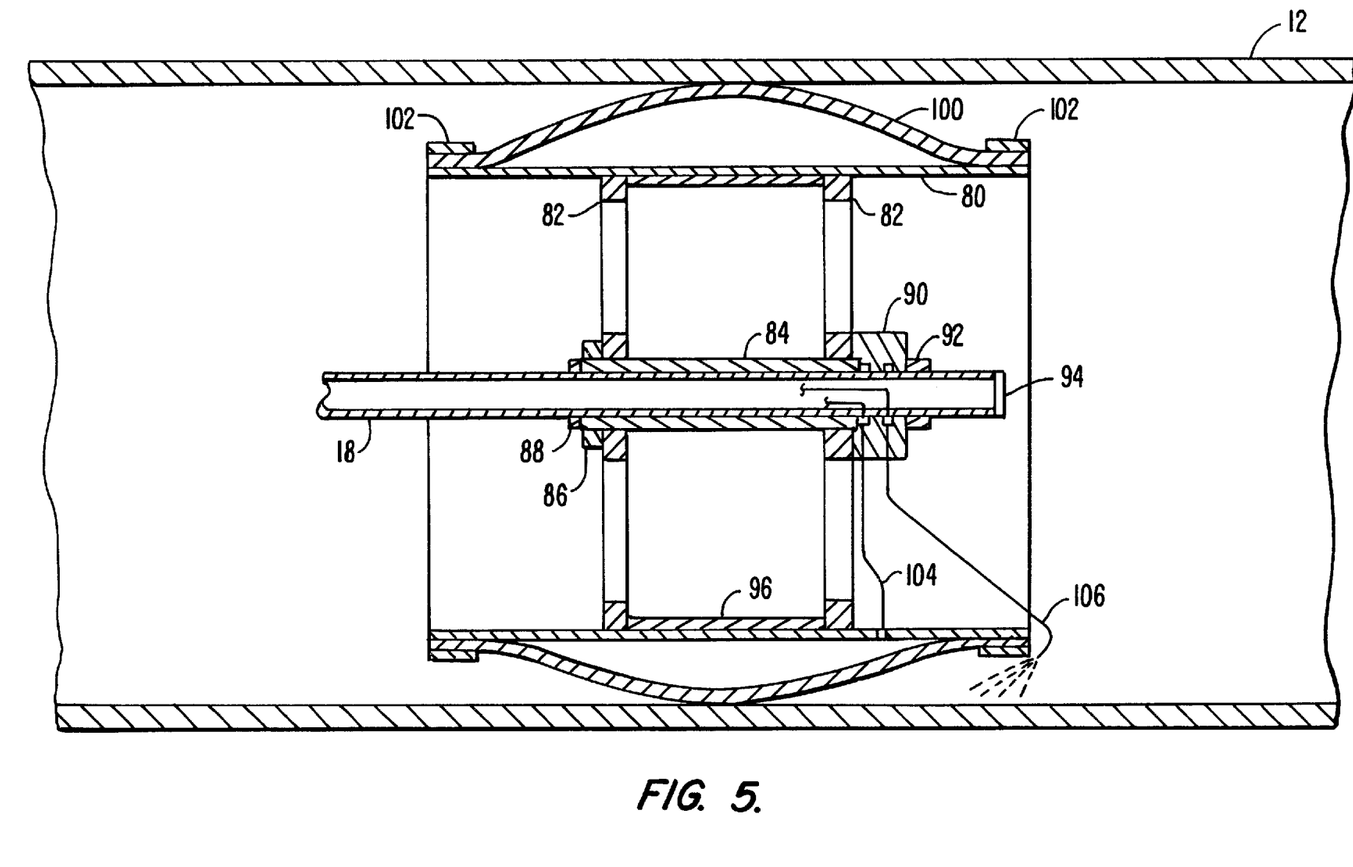
FIG. 5 is a partial cross-sectional front view of a passive pod in the pod assembly of FIG. 1.

As illustrated in FIG. 5, the passive pod 16 includes a generally cylindrical wall 80 having a front end and a rear end. In this embodiment, the cylindrical wall 80 is generally circular and smaller in diameter than the interior of the guide tube 12. The cylindrical wall 80 is substantially identical to the cylindrical wall 28 of the thrust pod assembly 14 in a specific embodiment. The axle 18 extends along the axis of the cylindrical wall 80, and is connected with the cylindrical wall by a pair of hubs 82 which are inboard hubs disposed inward from the front and rear ends of the wall 80, respectively. The hubs 82 include openings through which gas can flow between the front end and the rear end of the cylindrical wall 80. In one embodiment, the hubs 82 are substantially identical to the hubs 30 in the thrust pod assembly 14 as shown in FIG. 4.

A passive tubular member 84 is desirably disposed between the axle 18 and the hubs 82, as illustrated in FIG. 5. The passive tubular member 84 surrounds the axle 18. The tubular member 84 is rotatable on the axle 18 near one end by a removable collar 86 and clamp and bearing 88, and near the other end by a rotary seal and bearing 90 and clamp and thrust bearing 92. The connection allows the hubs 82 and cylindrical wall 80 to rotate relative to the axle 18 while maintaining a sealed connection therebetween. The end of the axle 18 is sealed with a sealing plug 94. A ring 96 is attached to the interior surface of the cylindrical wall 80 to locate the hubs 82 relative to the cylindrical wall 80. The hubs 82 may be attached to the ring 96 using bolts or the like. The passive pod 16 includes no thrust control features.

A passive pod tire 100 is coupled to the exterior of the cylindrical wall 80 by a pair of tire clamps 102 disposed at the two ends of the wall 80, respectively. The tire clamps 82 seal the connection to provide an airtight cavity or enclosure between the pod tire 100 and the cylindrical wall 80. The enclosure is expandable by air or gas supplied through a gas line 104 connected through the passive tubular member 84 and the hollow axle 18 to a gas source. The gas line 104 is coupled to the hollow axle 18 through the rotary seal and bearings assembly 90 to ensure proper gas connection and control even when the cylindrical wall 80 and hubs 82 rotate relative to the axle 18. FIG. 5 shows the pod tire 100 in an inflated state in contact with the guide tube 12. The pod tire 100 preferably has a smooth surface for making contact with the guide tube 12, and may be substantially identical to the pod tire 40 of the thrust pod assembly 14. The pressure in the enclosure is typically adjusted remotely by controlling the gas flow through the gas line 104 from the transportation module 24.

As shown in FIG. 5, the passive pod assembly 16 desirably includes a water line 106 supplying water for spraying to the pressure side of the pod tire 100, which is similar to the water line 76 used for the thrust pod assembly 14. The water line 106 extends through the rotary seal 36 and axle 18 to a water source. The water line 106 is coupled to the water source through the rotary seal and bearings assembly 90 to ensure proper gas connection and control even when the cylindrical wall 80 and hubs 82 rotate relative to the axle 18. The water spray provides a lubricant between the pod tire 100 and the guide tube 12, and may produce a hydroplaning effect between the pod tire 100 and guide tube 12. The pod tire 100 is inflated to provide a very small circumferential clearance between the pod tire 100 and the guide tube 12.

The radii of curvature of the thrust pod tire 40 and passive pod tire 100 in the embodiment shown are generally equal to the inner diameter of the guide tube 12. Of course, the radii of curvature may vary depending on physical factors required for specific transportation modules and terrain requirements. The small circumferential clearance between the thrust pod tire 40 and the guide tube 12 and the small clearance between the passive pod tire 100 and the guide tube 12 provide leakage of small amounts of gas around the thrust pod 14 and passive pod 16. This produces a venturi effect which tends to center the pods 14, 16 in the guide tube 12. Moreover, the rotation of the pods 14, 16 inside the guide tube 12 produces more even wear of the pod tires 40, 100. As shown in FIG. 1, rotational treads 110, 111 are provided on the external surfaces of the pod tires 40, 100 to cause rotation of the pods 14, 16 as they move inside the guide tube 12. The rotational treads 110, 111 are slanted slightly to provide slow rotation in the embodiment shown.

The pod assembly 10 is desirably made of light-weight, high-strength materials such as titanium, aluminum, high performance steels, and plastic materials. The combination of the thrust pod 14 and the passive pod 16 provides a stable support for the inner linkage 134 and inner magnetic coupler 20. Additional pods may be added for a larger or longer transportation module. For example, additional passive pods may be added to lengthen the pod assembly for supporting a longer transportation module.

In operation, the right side or upstream side of the pod assembly 10 is subjected to a higher pressure than the downstream side or left side by drawing a vacuum on the left side using the vacuum source 25, or pumping a gas into the right side using the pressure source 26, or both. The first bladder 48 and second bladder 60 of the thrust pod 14 are inflatable by gas through the gas line 44 and the gas line 64, respectively. The bladders 48, 60 are inflated to varying degrees to modulate gas passage through the pod assembly 10 and adjust the speed of pod assembly 10. In the fully inflated state, the bladders 48, 60 substantially block gas flow between the upstream and downstream sides of the pod assembly 10, resulting in maximum thrust of the pod assembly 10 in the guide tube 12. Water from the water line 106 lubricates the contact region between the thrust pod tire 82 and the guide tube 12. The contact region between the passive pod tire 100 of the passive pod 16 is also lubricated by water from the water line 106. The treads 110, 111 on the exterior of the pod tires 40, 100 cause the thrust pod 14 and passive pod 16 to rotate for more even wear.

Magnetic Coupling

Magnetic coupling is used to couple the pod assembly 10 and transfer its thrust to the transportation module 24. As shown in FIGS. 1 and 2, the inner magnetic coupler 20 is disposed adjacent the inner surface of the wall of the guide tube 12, while the outer magnetic coupler 22 is disposed adjacent the outer surface of the wall of the guide tube 12. The magnetic couplers 20, 22 may employ various mechanisms for generating magnetic fields including, for example, the use of small high strength permanent magnets 120, 122; or electromagnets, The guide tube 12 includes a longitudinal window 130 disposed between the magnetic couplers 20, 22. The window 130 is desirably made of a high strength non-metallic material such as plastic to eliminate any braking effect caused by induced eddy currents. In some embodiments, the entire guide tube 12 may be made of a high strength non-metallic material. In other embodiments, the guide tube 12 is made of a metallic pipe with a longitudinal window 130 of plastic or other non-metallic material.

Figure 6:
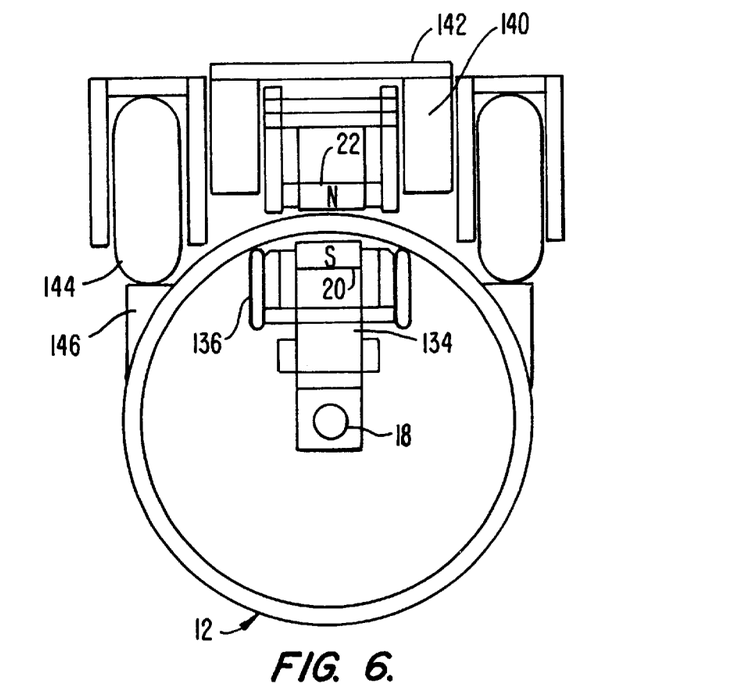
FIG. 6 is a partial cross-sectional end view along VI—VI of the guideway system of FIG. 1.

The inner magnetic coupler 20 is coupled with the axle 18 of the pod assembly 10 via an inner linkage 134 to avoid imparting magnetic loading on the pod assembly 10. The inner linkage 134 is typically made of a non-metallic material such as plastic. As seen in FIGS. 1, 2, and 6, inner wheels or rollers 136 are coupled to the inner magnetic coupler 20 to provide low friction roller contact with the inner surface of the guide tube 12. The inner magnetic coupler 20 is supported by the pod assembly 10, but its position with respect to the inner surface of the guide tube 12 may change during movement of the pod assembly 10. The inner wheels 136 maintain a proper spacing between the inner magnetic coupler 20 and the inner surface of the guide tube 12 to allow the inner magnetic coupler 20 to be as close to the inner surface of the guide tube 12 as possible without touching or dragging on the guide tube 12. For example, the spacing between the inner magnetic coupler 20 and the inner surface of the guide tube 12 is maintained at about 0.03–0.5 inch. This enables the inner magnetic coupler 20 to transmit the maximum possible magnetic thrust with minimum friction. Of course, the inner wheels 136 may be replaced by other types of low friction members such as low friction skids and air cushions. FIGS. 1 and 2 show inner wheels 136 at the two ends of the inner magnetic coupler 20, but additional wheels may be added between the two ends. The wheels 136 desirably are pneumatic tires.

Figure 7:
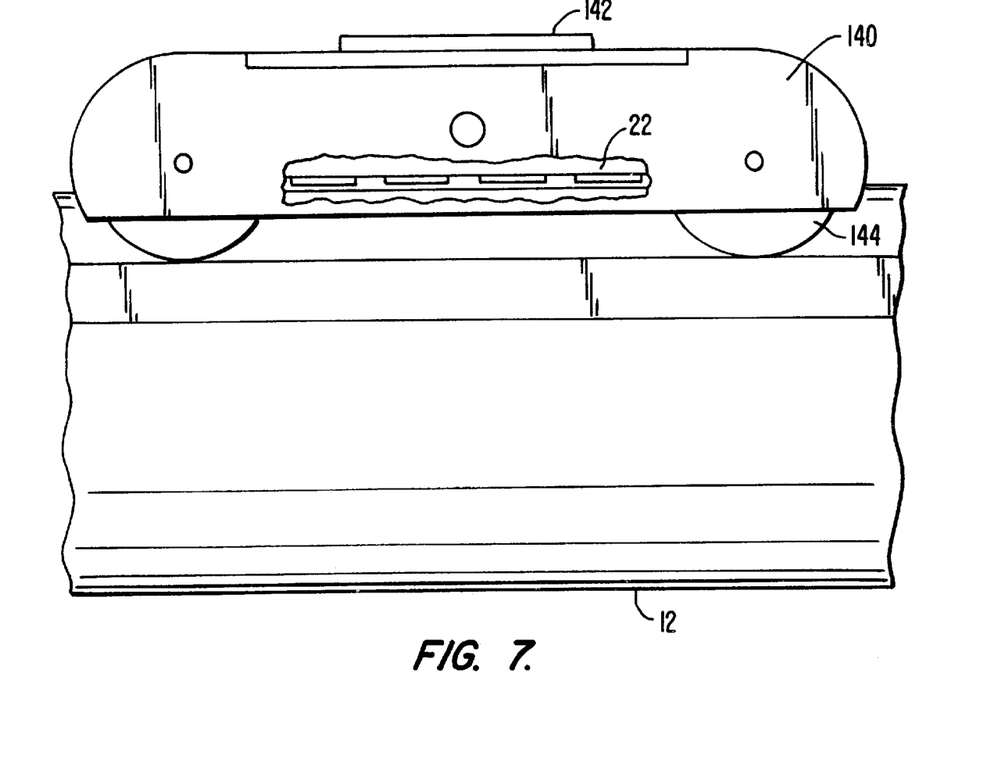
FIG. 7 is a front elevational view of a transportation module support assembly in the guideway system of FIG. 2.

As illustrated in FIGS. 1, 6, and 7, an outer linkage 140 is provided to connect the outer magnetic coupler 22 with the transportation module 24 to avoid imparting magnetic loading on the module 24. The outer linkage 140 is typically made of a non-metallic material such as plastic. As best seen in FIG. 7, the outer linkage 140 is a truck assembly which desirably includes a mounting swivel 142 for connecting to the transportation module 24. Outer wheels or rollers 144 are coupled to the outer magnetic coupler 22 to provide low friction roller contact with the outer surface of the guide tube 12. FIG. 6 shows the outer wheels 144 supported by outer wheel supports 146 provided on the outer surface of the guide tube 12. The outer wheels 144 maintain a proper spacing between the outer magnetic coupler 22 and the outer surface of the guide tube 12 to allow the outer magnetic coupler 22 to be as close to the outer surface of the guide tube 12 as possible without touching or dragging on the guide tube 12. For example, the spacing between the outer magnetic coupler 22 and the outer surface of the guide tube 12 is maintained at about 0.03–0.5 inch. This enables the inner magnetic coupler 20 to transmit the maximum possible magnetic thrust to the outer magnetic coupler 22 with minimum friction. The outer wheels 144 may be replaced by other types of low friction members such as low friction skids and air cushions. The outer wheels 144 are typically provided at the two ends of the outer truck assembly 140, and additional wheels may be added between the two ends. The wheels 144 desirably are pneumatic tires.

Both the inner linkage 134 and the outer linkage 140 are set up in an opposing manner with enough clearance to enable the desired adjusting movement. The opposed linkage arrangement facilitates and optimizes the bi-directional capability of the pod assembly 10. Each transportation module 24 may typically incorporate two truck assemblies 140 with only one of the assemblies 140 carrying an outer magnetic coupler 22. In some embodiments, both truck assemblies 140 may be equipped with outer magnetic couplers 22.

Because the transportation module 24 and the pod assembly 10 are not mechanically connected, control of the pod assembly 10 is desirably accomplished remotely, for instance, by radio control via a close coupled antenna disposed outside the window 130 for controlling an appropriate power module for all control functions of the pod assembly 10.

Magnetic coupling allows disengagement of the pod assembly 10 and transportation module 24 without any mechanical linkage or disengagement. Disengagement can be readily accomplished by reducing the magnetic field strength between the inner magnetic coupler 20 and the outer magnetic coupler 22. Because the transportation module 24 is supported by the exterior surface of the guide tube 12, the weight of the transportation module 24 is not carried by the pod assembly 10. In the event that either the pod assembly 10 or the transportation module 24 is to be stopped or severely slowed by an obstruction or other unexpected event, the magnetic coupling would act as a shear pin and reduce damage to the system.

The above-described arrangements of apparatus and methods are merely illustrative of applications of the principles of this invention and many other embodiments and modifications may be made without departing from the spirit and scope of the invention as defined in the claims. For instance, the guide tube, pod assembly, and magnetic couplers may have other shapes and configurations. The scope of the invention should, therefore, be determined not with reference to the above description, but instead should be determined with reference to the appended claims along with their fill scope of equivalents.

What is claimed is:

1. A transportation system for moving a transportation module comprising:
    a thrust tube;
    a pod assembly disposed inside the thrust tube to be thrusted along the thrust tube;
    an inner magnetic coupler disposed inside the thrust tube and being connected with the pod assembly to be moved by the pod assembly, the inner magnetic coupler disposed adjacent an upper portion of the thrust tube, and remote from a bottom portion of the thrust tube and extending longitudinally along the upper portion of the thrust tube; and
    an outer magnetic coupler disposed outside the thrust tube and being configured to connect with a transportation module, the outer magnetic coupler disposed adjacent the upper portion of the thrust tube, and remote from a bottom portion of the thrust tube, and extending longitudinally along the upper portion of the thrust tube, the outer magnetic coupler being disposed above the inner magnetic coupler and the thrust tube and being spaced from the inner magnetic coupler by the thrust tube, the outer magnetic coupler being magnetically coupled with the inner magnetic coupler and being movable by the inner magnetic coupler.

2. The transportation system of claim 1 further comprising an inner linkage connected between the inner magnetic coupler and the pod assembly, the inner linkage preventing magnetic loading on the pod assembly by the inner magnetic coupler.

3. The transportation system of claim 2 wherein the inner linkage is made of a non-metallic material.

4. The transportation system of claim 1 further comprising an outer linkage configured to be connected between the outer magnetic coupler and the transportation module to prevent magnetic loading on the transportation module by the outer magnetic coupler.

5. The transportation system of claim 4 wherein the outer linkage comprises a truck assembly made of a non-metallic or a nonmagnetic material.

6. The transportation system of claim 1 further comprising means for maintaining a spacing between the inner magnetic coupler and the inner surface of the thrust tube at about 0.03 to about 0.5 inch.

7. The transportation system of claim 6 wherein the means comprises a plurality of wheels coupled between the inner magnetic coupler and the inner surface of the upper portion of the thrust tube.

8. The transportation system of claim 1 further comprising means for maintaining a spacing between the outer magnetic coupler and the outer surface of the thrust tube at about 0.03 to about 0.5 inch.

9. The transportation system of claim 8 wherein the means comprises a plurality of wheels coupled between the outer magnetic coupler and the outer surface of the upper portion of the thrust tube.

10. The transportation system of claim 1 wherein at least the portion of the thrust tube between the inner magnetic coupler and the outer magnetic coupler is made of a non-metallic material.

11. The transportation system of claim 1 wherein the pod assembly comprises a thrust pod connected with the inner magnetic coupler.

12. A transportation system for moving a transportation module comprising:
    a thrust tube;
    a pod assembly disposed inside the thrust tube to be thrusted along the thrust tube;
    an inner magnetic coupler disposed inside the thrust tube and being connected with the pod assembly to be moved by the pod assembly; and
    an outer magnetic coupler disposed outside the thrust tube and being configured to connect with a transportation module, the outer magnetic coupler being spaced from the inner magnetic coupler by the thrust tube, the outer magnetic coupler being magnetically coupled with the inner magnetic coupler and being movable by the inner magnetic coupler;
    wherein the thrust pod comprises:
        a thrust pod body including a generally cylindrical wall having a front end and a rear end, the thrust pod body being smaller in cross-section than the thrust tube, a portion of the front end being open and a portion of the rear end being open to allow gas flow through the thrust pod body between the front end and the rear end;
        a thrust pod tire coupled with the generally cylindrical wall of the thrust pod body to define an outer annular enclosure between the thrust pod tire and the wall of the thrust pod body, the thrust pod tire being inflatable to make contact with the interior of the thrust tube and deflatable to open gas flow between the thrust pod body and the thrust tube; and
        at least one bladder disposed inside the thrust pod body, the bladder being inflatable and deflatable to modulate gas flow through the thrust pod body to adjust speed of movement of the thrust pod body inside the thrust tube.

13. A transportation system for moving a transportation module comprising:
    a thrust tube;
    a pod assembly disposed inside the thrust tube to be thrusted along the thrust tube;
    an inner magnetic coupler disposed inside the thrust tube and being connected with the pod assembly to be moved by the pod assembly; and
    an outer magnetic coupler disposed outside the thrust tube and being configured to connect with a transportation module, the outer magnetic coupler being spaced from the inner magnetic coupler by the thrust tube, the outer magnetic coupler being magnetically coupled with the inner magnetic coupler and being movable by the inner magnetic coupler;
    wherein the pod assembly further comprises a passive pod connected with the inner magnetic coupler, the thrust pod and the passive pod being disposed on opposite sides of the inner magnetic coupler, the passive pod comprising:
        a passive pod body including a generally cylindrical wall having a front end and a rear end, the passive pod body being smaller in cross-section than the thrust tube, a portion of the front end being open and a portion of the rear end being open to allow gas flow through the passive pod body between the front end and the rear end; and a passive pod tire coupled with the generally cylindrical wall of the passive pod body to define an outer annular enclosure between the passive pod tire and the wall of the passive pod body, the passive pod tire being inflatable to make contact with the interior of the thrust tube and deflatable to open gas flow between the passive pod body and the thrust tube.

14. A transportation system for moving a transportation module comprising:

a thrust tube;

an inner drive member disposed inside the thrust tube to be thrusted along the thrust tube;

an inner magnetic coupler disposed inside the thrust tube and being connected with the inner drive member to be moved by the inner drive member, the inner magnetic coupler disposed adjacent an upper portion of the thrust tube, and remote from a bottom portion of the thrust tube, and extending longitudinally along the upper portion of the thrust tube;

an inner spacing member disposed inside the thrust tube and spacing the inner magnetic coupler from the inner surface of the thrust tube by a preset distance; and an outer magnetic coupler disposed outside the thrust tube and being configured to connect with a transportation module, the outer magnetic coupler disposed adjacent the upper portion of the thrust tube, and remote from a bottom portion of the the thrust tube, and extending longitudinally along the upper portion of the thrust tube, the outer magnetic coupler being disposed above the inner magnetic coupler and the thrust tube and being magnetically coupled with the inner magnetic coupler to be moved by the inner magnetic coupler.

15. The transportation system of claim 14 wherein the inner support member spaces the inner magnetic coupler from the inner surface of the thrust tube by about 0.03 to about 0.5 inch.

16. The transportation system of claim 14 wherein the inner spacing member comprises a plurality of rollers coupled between the inner magnetic coupler and the inner surface of the upper portion of the thrust tube.

17. The transportation system of claim 14 further comprising means for preventing magnetic loading on the inner drive member by the inner magnetic coupler.

18. A transportation system for moving a transportation module comprising:

a thrust tube;

an inner drive member disposed inside the thrust tube to be thrusted along the thrust tube;

an inner magnetic coupler disposed inside the thrust tube and being connected with the inner drive member to be moved by the inner drive member, the inner magnetic coupler disposed adjacent an upper portion of the thrust tube, and remote from a bottom portion of the the thrust tube, and extending longitudinally along the upper portion of the thrust tube;

an outer magnetic coupler disposed outside the thrust tube and being configured to connect with a transportation module, the outer magnetic coupler disposed adjacent the upper portion of the thrust tube, and remote from a bottom portion of the thrust tube, and extending longitudinally along the upper portion of the thrust tube, the outer magnetic coupler being disposed above the inner magnetic coupler and the thrust tube and being magnetically coupled with the inner magnetic coupler to be moved by the inner magnetic coupler; and an outer spacing member disposed outside the thrust tube and spacing the outer magnetic coupler from the outer surface of the thrust tube by a preset distance.

19. The transportation system of claim 18 wherein the outer support member spaces the outer magnetic coupler from the outer surface of the thrust tube by about 0.03 to about 0.5 inch.

20. The transportation system of claim 18 wherein the outer spacing member comprises a plurality of rollers coupled between the outer magnetic coupler and the outer surface of the upper portion of the thrust tube.

21. The transportation system of claim 18 further comprising means for preventing magnetic loading on the outer drive member by the outer magnetic coupler.

* * * * *